US008606048B2

(12) United States Patent
Kurigata

(10) Patent No.: US 8,606,048 B2
(45) Date of Patent: Dec. 10, 2013

(54) IMAGE PROCESSING APPARATUS AND IMAGE PROCESSING METHOD

(75) Inventor: Yuhei Kurigata, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 114 days.

(21) Appl. No.: 13/238,317

(22) Filed: Sep. 21, 2011

(65) Prior Publication Data

US 2012/0076439 A1    Mar. 29, 2012

(30) Foreign Application Priority Data

Sep. 24, 2010  (JP) ................................ 2010-214214

(51) Int. Cl.
*G06K 9/32*     (2006.01)
*G06F 15/00*    (2006.01)

(52) U.S. Cl.
USPC ............................ 382/300; 382/299; 358/1.9

(58) Field of Classification Search
USPC ......... 382/168–172, 251, 176, 224, 180, 162, 382/165, 166, 298–300; 358/1.9, 3.03, 462, 358/464, 466, 518–522, 461, 463, 465, 467
See application file for complete search history.

(56) References Cited

U.S. PATENT DOCUMENTS

| 5,113,248 | A | * | 5/1992 | Hibi et al. ..................... 358/501 |
| 5,293,254 | A | * | 3/1994 | Eschbach ...................... 358/445 |
| 5,345,517 | A | * | 9/1994 | Katayama et al. ............. 382/299 |
| 5,418,626 | A | * | 5/1995 | Semasa ......................... 358/451 |
| 6,115,504 | A | * | 9/2000 | Kumashiro .................... 382/273 |
| 6,389,162 | B2 | * | 5/2002 | Maeda .......................... 382/172 |
| 2002/0051152 | A1 | * | 5/2002 | Kurose .......................... 358/1.9 |
| 2007/0019243 | A1 | * | 1/2007 | Sato et al. .................... 358/3.27 |

FOREIGN PATENT DOCUMENTS

| JP | 62-213383 | 9/1987 |
| JP | 2006-80712 | 3/2006 |

* cited by examiner

*Primary Examiner* — Andrae S Allison
(74) *Attorney, Agent, or Firm* — Finnegan, Henderson, Farabow, Garrett & Dunner, L.L.P.

(57) ABSTRACT

An image processing apparatus for scaling an image including: an operation position determining section for determining a pixel operation position, which is either a pixel inserting or deleting position, based on a scaling ratio; an inserting/deleting section for inserting/deleting a pixel to/from the pixel operation position determined by the operation position determining section; an error calculating section for calculating a density difference as an error between densities in a vicinity of the inserted/deleted pixel via the inserting/deleting section, before and after the insertion or deletion; and an error allocating section for allocating the error, calculated by the error calculating section, to the inserted pixel and pixels in a vicinity of the inserted or deleted pixel, so that a pixel value, after allocation, of a pixel of an allocation destination, falls within an allowable range estimated from a pixel value of a pixel near the pixel of allocation destination.

19 Claims, 21 Drawing Sheets

FIG. 6a

| 0 | 0 | 0 | 0 | 0 | 0 | 0 | 0 | 0 |
|---|---|---|---|---|---|---|---|---|
| 255 | 255 | 255 | 255 | 255 | 255 | 255 | 255 | 255 |
| 255 | 255 | 255 | 255 | 255 | 255 | 255 | 255 | 255 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 255 | 255 | 255 | 255 | 255 | 255 | 255 | 255 | 255 |
| 255 | 255 | 255 | 255 | 255 | 255 | 255 | 255 | 255 |
| 0 | 0 | 0 | 0 | 0 | 0 | 0 | 0 | 0 |

ORIGINAL IMAGE

| 0 | 0 | 0 | 0 | 0 | 0 | 0 | 0 | 0 |
|---|---|---|---|---|---|---|---|---|
| 255 | 255 | 255 | 255 | 255 | 128 | 0 | 0 | 0 |
| 255 | 255 | 255 | 255 | 255 | 255 | 255 | 255 | 255 |
| 0 | 0 | 0 | 0 | 0 | 255 | 255 | 255 | 255 |
| 0 | 0 | 0 | 0 | 0 | 0 | 0 | 0 | 0 |
| 255 | 255 | 255 | 255 | 0 | 0 | 0 | 0 | 0 |
| 255 | 255 | 255 | 255 | 255 | 255 | 255 | 255 | 255 |
| 0 | 0 | 0 | 255 | 255 | 255 | 255 | 255 | 255 |
| 0 | 0 | 0 | 0 | 0 | 0 | 0 | 0 | 0 |

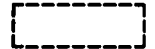 ADJACENT PIXELS

— PIXEL INSERTING POSITION

 INSERTED PIXEL

---

CALCULATIONS WITH RESPECT TO P3

(AVERAGE PIXEL VALUE OF ADJACENT PIXELS) =
(255 + 255 + 0 + 0 + 0 + 255)/6 = 128

RANGE OF PIXEL VALUES OF ADJACENT PIXELS ABOVE
AND BELOW TARGET PIXEL: FROM 0 TO 0

Dmax = 0, Dmin = 0

(PIXEL VALUE OF INSERTED PIXEL) = 0

(ERROR VALUE) = (AVERAGE PIXEL VALUE OF ADJACENT PIXELS)
− (PIXEL VALUE OF INSERTED PIXEL) = 128 − 0 = 128

FIG. 7a

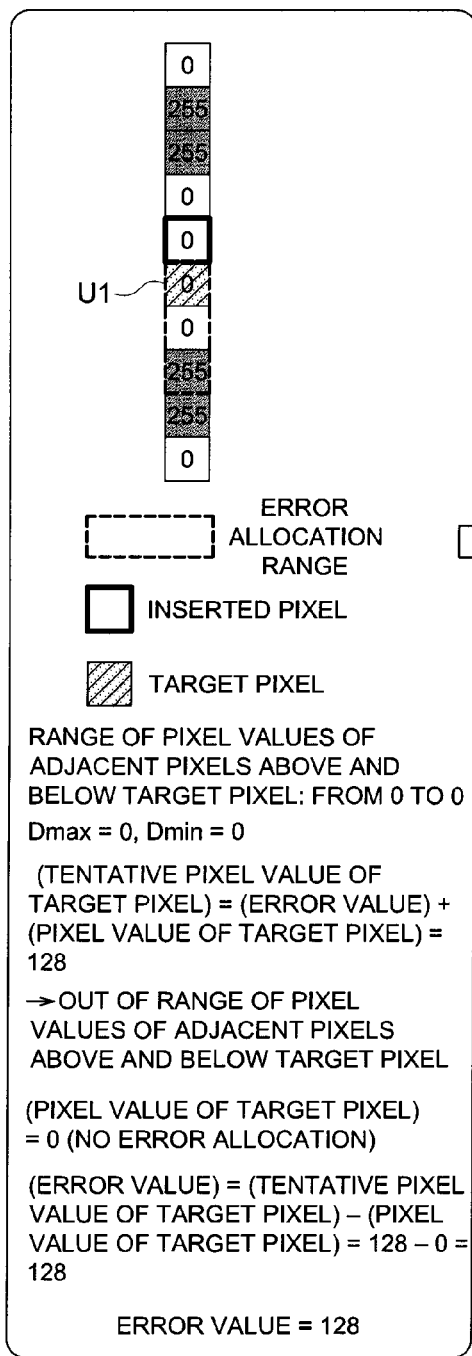

ERROR ALLOCATION RANGE

INSERTED PIXEL

TARGET PIXEL

RANGE OF PIXEL VALUES OF ADJACENT PIXELS ABOVE AND BELOW TARGET PIXEL: FROM 0 TO 0

Dmax = 0, Dmin = 0

(TENTATIVE PIXEL VALUE OF TARGET PIXEL) = (ERROR VALUE) + (PIXEL VALUE OF TARGET PIXEL) = 128

→ OUT OF RANGE OF PIXEL VALUES OF ADJACENT PIXELS ABOVE AND BELOW TARGET PIXEL (PIXEL VALUE OF TARGET PIXEL) = 0 (NO ERROR ALLOCATION)

(ERROR VALUE) = (TENTATIVE PIXEL VALUE OF TARGET PIXEL) − (PIXEL VALUE OF TARGET PIXEL) = 128 − 0 = 128

ERROR VALUE = 128

FIG. 7b

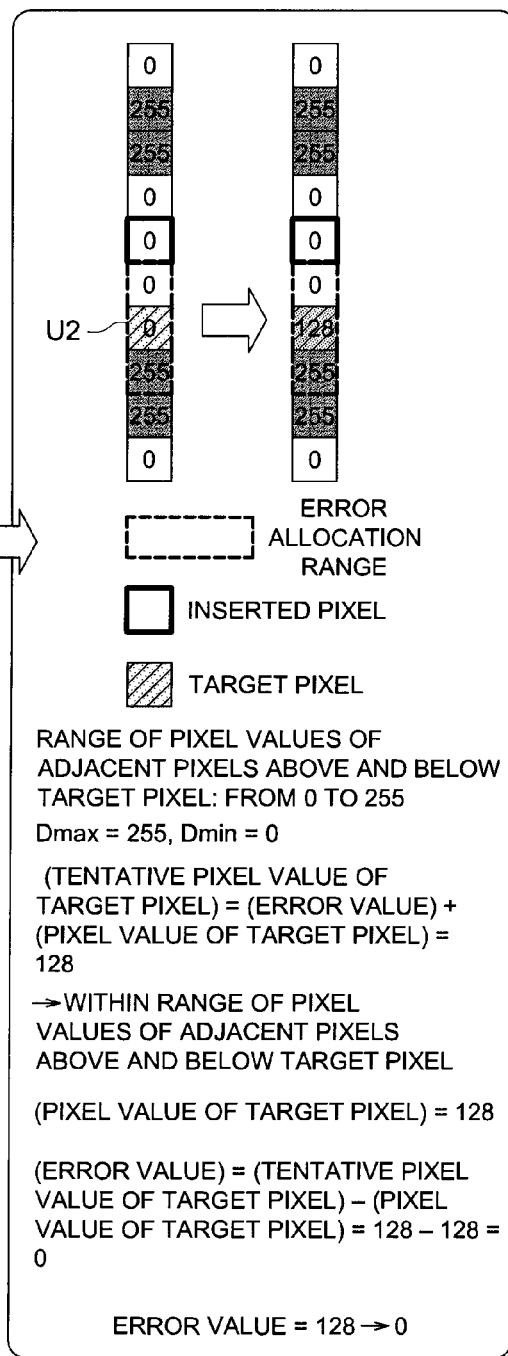

ERROR ALLOCATION RANGE

INSERTED PIXEL

TARGET PIXEL

RANGE OF PIXEL VALUES OF ADJACENT PIXELS ABOVE AND BELOW TARGET PIXEL: FROM 0 TO 255

Dmax = 255, Dmin = 0

(TENTATIVE PIXEL VALUE OF TARGET PIXEL) = (ERROR VALUE) + (PIXEL VALUE OF TARGET PIXEL) = 128

→ WITHIN RANGE OF PIXEL VALUES OF ADJACENT PIXELS ABOVE AND BELOW TARGET PIXEL (PIXEL VALUE OF TARGET PIXEL) = 128

(ERROR VALUE) = (TENTATIVE PIXEL VALUE OF TARGET PIXEL) − (PIXEL VALUE OF TARGET PIXEL) = 128 − 128 = 0

ERROR VALUE = 128 → 0

FIG. 8
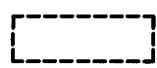 ADJACENT PIXELS
 INSERTED PIXEL

ORIGINAL IMAGE

☐ PIXEL DELETING POSITION

FIG. 11b

ERROR VALUE: – 170

⌐ ⌐ ADJACENT PIXELS

— PIXEL DELETING POSITION

CALCULATIONS OF ERROR VALUE GENERATED BY DELETION OF P5

(AVERAGE PIXEL VALUE OF ADJACENT PIXELS) =
(255 + 255 + 0 + 0 + 255 + 255)/6 = 170

(PIXEL VALUE OF DELETED PIXEL) = 0

(ERROR VALUE) = (PIXEL VALUE OF DELETED PIXEL) –
(AVERAGE PIXEL VALUE OF ADJACENT PIXELS) = 0 – 170 = – 170

FIG. 13
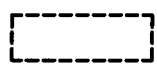 ADJACENT PIXELS
 PIXEL DELETING POSITION

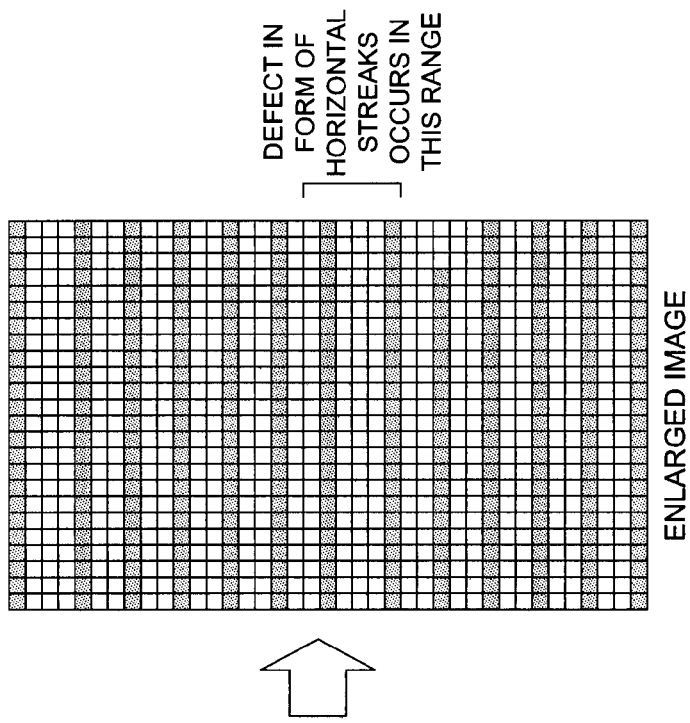
FIG. 18c ENLARGED IMAGE
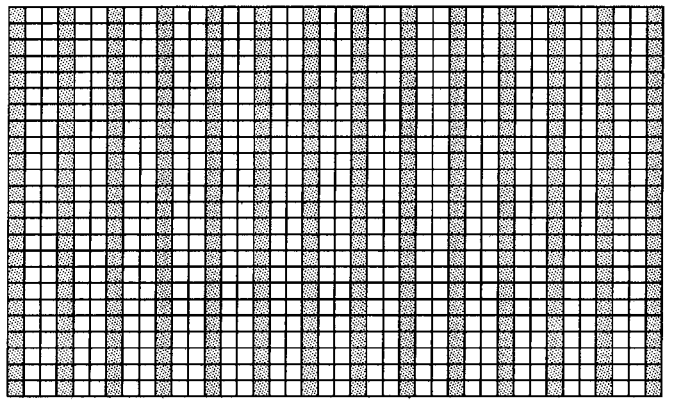
FIG. 18b ORIGINAL IMAGE
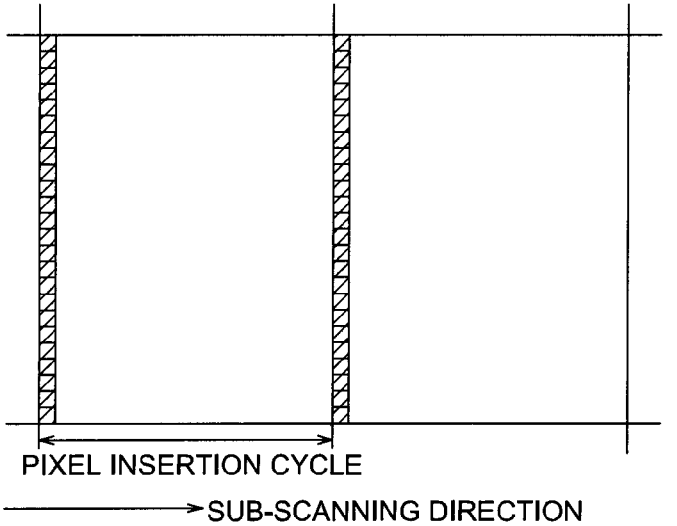
FIG. 18a

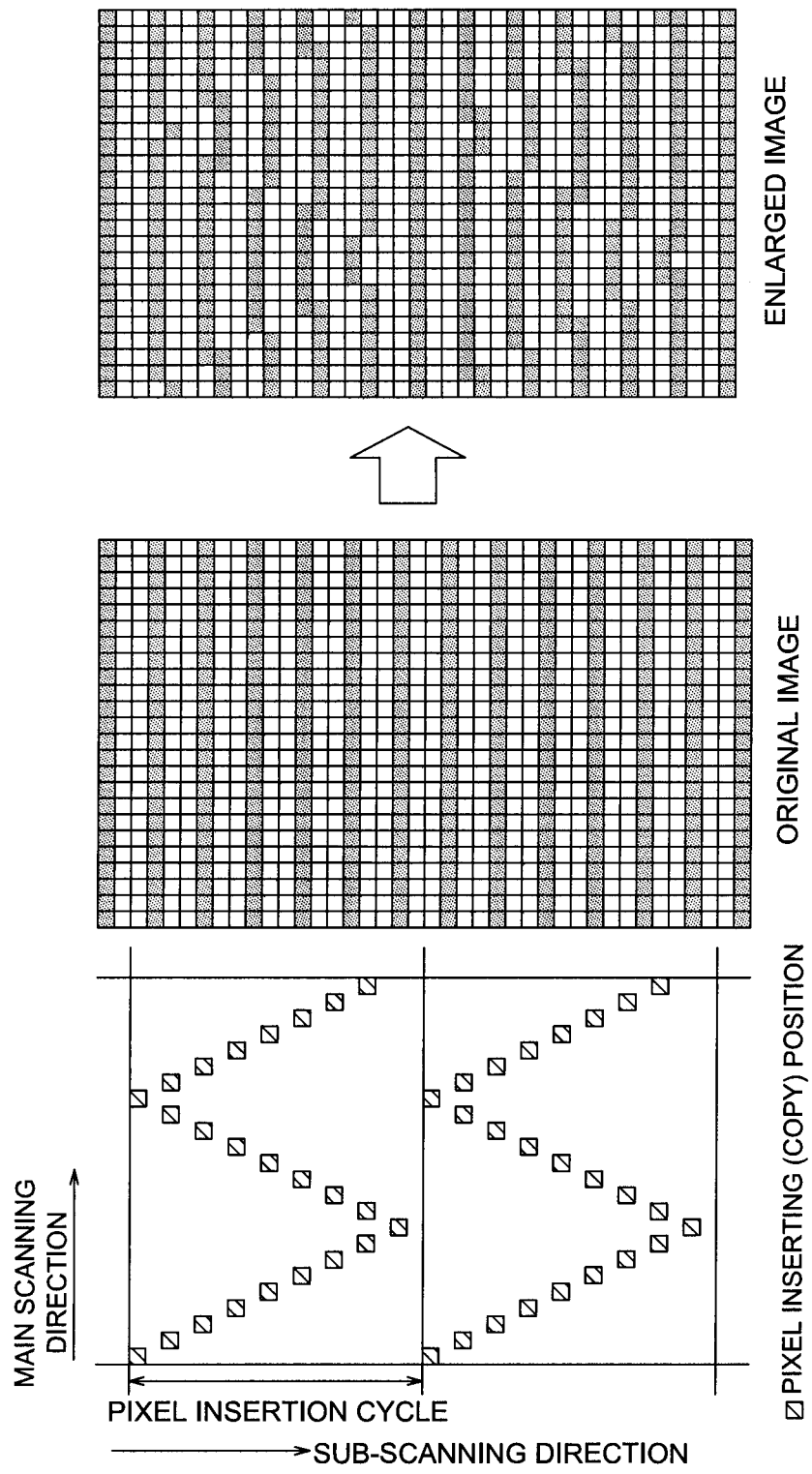

ORIGINAL IMAGE

ENLARGED IMAGE

☐ INSERTED PIXEL

⬭ LOCAL DENSITY REDUCTION

⬭ LOCAL DENSITY INCREASING

▬ PIXEL INSERTING POSITION

FIG. 21a

CALCULATION OF AVERAGE
DENSITY BEFORE PIXEL INSERTION
AVERAGE DENSITY = 128
(255+255+0+0+0+255)÷6=128

FIG. 21b

CALCULATION OF AVERAGE
DENSITY AFTER PIXEL INSERTION
AVERAGE DENSITY = 109
(255+255+0+0+0+0+255)÷7=109

FIG. 21c

ADJUSTMENT OF INSERTED PIXEL
SO AS TO MAINTAIN AVERAGE
DENSITY BEFORE AND AFTER
PIXEL INSERTION
(255+255+0+128+0+0+255)÷7=128

- - - RANGE FOR CALCULATION OF AVERAGE DENSITY
— PIXEL INSERTING POSITION
☐ INSERTED PIXEL

IMAGE PROCESSING APPARATUS AND IMAGE PROCESSING METHOD

This application is based on Japanese Patent Application No. 2010-214214 filed on Sep. 24, 2010 with the Japanese Patent Office, the entire content of which is hereby incorporated by reference.

TECHNICAL FIELD

This invention relates to an image processing apparatus and image processing method for scaling an image.

BACKGROUND OF THE INVENTION

As an image scaling (enlarging or reducing) method, a nearest neighbor method, and the like, is known. In case of the nearest neighbor method, when an image formed of pixels, being arranged in two dimensions, which are the main scanning direction and sub-scanning direction as shown in FIGS. 18a, 18b and 18c as an example, are to be enlarged in the sub-scanning direction, pixels are copied in a pixel insertion cycle according to the enlargement ratio, and the copied pixels are inserted below the pixels in the sub-scanning direction. FIG. 18a illustrates the pixel insertion cycle, FIG. 18b illustrates an original image, and FIG. 18c illustrates the image after scaling (enlarging). The original image, illustrated in FIG. 18b, is an image in which a pattern of "two white lines between a black line and a black line" repeats. In case of the image after scaling, as illustrated in FIG. 18c, a white line is copied at the position of pixel insertion cycle and the copied white line is inserted below the white line, and therefore, the areas where three white lines exist between a black line and a black line are produced.

Although image sharpness can be maintained in cases of scaling by using the nearest neighbor method, or the like, density unevenness occurs in the image in the form of horizontal streaks in cases of an image of a fine pattern because the position of insertion of pixel is lined on the same line.

Meanwhile, an image scaling method, in which the pixel inserting position is dispersed, has been disclosed. FIGS. 19a, 19b, and 19c illustrate examples of cases in which the pixel inserting position is dispersed in accordance with a repeating pattern of a V character. FIG. 19a illustrates a dispersal pattern, FIG. 19b illustrates an original image, and FIG. 19c illustrates a scaled image in which pixels have been inserted in accordance with the dispersal pattern of FIG. 19a. In case of the above-mentioned dispersing method, because the position of insertion of pixels is dispersed, density unevenness becomes less noticeable when compared with the image after scaling illustrated in FIG. 18c.

However, the local density varies at the pixel inserting position. As an example, as illustrated in FIGS. 20a and 20b, when compared with the original image (FIG. 20a) in which two black lines and three white lines appear periodically, in the case of the scaled image (FIG. 20b) which has been formed by inserting white pixel P1 and black pixel P2 in the original image, the local density decreases near the position where white pixel P1 has been inserted, while on the other hand, the local density increases near the position where black pixel P2 has been inserted. In cases of deleting pixels for image scaling (reducing), the local density increases near the position where a white pixel has been deleted, and the local density decreases near the position where a black pixel has been deleted.

In order to overcome this problem, methods to determine the density of inserted pixels have been suggested so that density in the vicinity of the pixel inserting position before and after pixel insertion remains constant.

As an example, an image enlargement/reduction apparatus has been disclosed in Unexamined Japanese Patent Application Publication No. 1987-213383 (hereinafter referred to as Patent Document 1), in which, in a case of representing a pseudo-halftone by using white pixels and black pixels, a part of the pixels, in the vicinity of the position where a pixel has been inserted or deleted, is replaced by white or black pixels so that the density near inserted or deleted pixel does not change before and after pixel insertion or deletion.

Also, in Unexamined Japanese Patent Application Publication No. 2006-80712 (hereinafter referred to as Patent Document 2), a technology has been disclosed in which, when an error diffusion process, in which density error, which occurs when a target pixel of a multilevel is binarized, is distributed to pixels in the vicinity thereof, and registration correction to correct pixel position deviation is performed, if a target pixel in the error diffusion process is the pixel located in the position where density is to be corrected during registration correction, the density value of the target pixel is distributed to peripheral pixels as an error with no change.

When adapting a method in which the density of inserted pixel is determined so that the density of the vicinity of the pixel inserting position before and after pixel insertion remains constant, there will be no problem if the density of the pixel of the pixel inserting position is adjusted or density error is distributed to peripheral pixels by using an error diffusion process, or the like, concurrently as described in the above-mentioned Patent Documents 1 and 2. However, in cases in which an error diffusion process is not used concurrently, isolated points are generated at pixel inserting positions, resulting in a change of the image form before and after pixel insertion.

As an example, as illustrated in FIGS. 21a, 21b, and 21c, in a case of a simple method in which the pixel value of inserted pixel is adjusted (in this example, pixel value is adjusted to 128) so as to maintain the average density of the vicinity of the pixel inserting position before and after pixel insertion by obtaining the average density of the vicinity of the pixel inserting position before pixel insertion (FIG. 21a), and the average density of the vicinity of the pixel inserting position after white pixel P1 is inserted in the pixel inserting position (FIG. 21b), the inserted pixel becomes an intermediate density value at isolated point P1', resulting in a change of the image form when compared with the original image.

SUMMARY OF THE INVENTION

The present invention has been achieved in consideration of the above problems, and to provide an image processing apparatus and image processing method capable of scaling an image while reducing changes of the image form and density variation.

[1] To achieve at least one of the above-stated objects, an image processing apparatus for scaling an image reflecting one aspect of the present invention may include, but is not limited to:

an operation position determining section for determining a pixel operation position which is either a pixel inserting position or pixel deleting position in accordance with a scaling ratio;

an inserting/deleting section for inserting a pixel to or deleting a pixel from the pixel operation position having been determined by the operation position determining section;

an error calculating section for calculating a density difference as an error between densities of a vicinity of a pixel which has been inserted or deleted via the inserting/deleting section, before and after the insertion or deletion is carried out; and an error allocating section which is configured to allocate the error, having been calculated by the error calculating section, to the inserted pixel, and pixels in a vicinity of the inserted or deleted pixel, in such a manner that a pixel value, after allocation, of a pixel of an allocation destination, falls within an allowable range which is estimated from a pixel value of a pixel near the pixel of allocation destination.

[2] The image processing apparatus of [1], reflecting another aspect of the present invention, wherein the error calculating section restricts the vicinity to an area generated in a direction of scaling via the insertion or deletion with respect to the pixel which has been inserted or deleted by the inserting/deleting section.

[3] The image processing apparatus of [1], reflecting still another aspect of the present invention, wherein the error allocating section is configured to carry out the allocation of error only to pixels within a predetermined area with respect to the inserted or deleted pixel.

[4] The image processing apparatus of [1], reflecting still another aspect of the present invention, wherein the error allocating section is configured to allocate a remaining error by reducing it as a distance from the pixel of allocation destination increases.

[5] The image processing apparatus of [1], reflecting still another aspect of the present invention, wherein the allowable range is a range of a pixel value which is estimated via a predetermined plurality of interpolation algorithms.

[6] The image processing apparatus of [1], reflecting still another aspect of the present invention, wherein pixel values of pixels adjacent to an allocation destination or to a pixel to be inserted are set as a maximum value and a minimum value of the allowable range.

[7] An image processing method for scaling an image reflecting one aspect of the present invention, wherein an image processing section may include, but is not limited to, the steps of determining a pixel operation position which is either a pixel inserting position or a pixel deleting position;

inserting or deleting a pixel to or from the pixel operation position having been determined by the step of determining a pixel operation position;

calculating a density difference, as an error, between densities of a vicinity of a pixel, which has been inserted or deleted via the step of inserting deleting a pixel, before and after the insertion or deletion;

allocating a density difference, having been calculated by said step of calculating a density difference as an error, to said inserted pixel and pixels in a vicinity of said inserted pixel or deleted pixels, in such a manner that a pixel value, after allocation of the error, of pixel of allocation destination to which the error has been allocated, falls within an allowable range which is estimated from a pixel value of a pixel near said pixel of allocation destination.

BRIEF DESCRIPTION OF THE DRAWINGS

The preferred embodiments of the present invention are shown by way of example, and not limitation, in the accompanying figures, in which:

FIGS. 6a and 6b are explanatory diagrams illustrating an example of an enlarging processing of an image carried out by an image processing apparatus according to a preferred embodiment of the present invention.

FIGS. 7a and 7b are explanatory diagrams illustrating the continuation of FIGS. 6a and 6b (error value allocation).

FIG. 8 is an explanatory diagram illustrating a state when a scaling processing with respect to the original image illustrated in FIG. 6a has been completes.

FIGS. 11a and 11b are explanatory diagrams illustrating an example of a reducing processing of an image carried out by an image processing apparatus according to a preferred embodiment of the present invention.

FIG. 13 is an explanatory diagram illustrating a state when a reducing processing with respect to the original image illustrated in FIG. 11a has been completed.

FIGS. 18a, 18b and 18c are explanatory diagrams illustrating an example of image enlargement carried out by a nearest neighbor method.

FIGS. 19a, 19b and 19c are explanatory diagrams illustrating an example of image enlargement in a case in which a pixel inserting position is dispersed in accordance with a repeating pattern of a "V" character.

FIGS. 20a and 20b are explanatory diagrams illustrating an example of a case in which a local density variation occurs when pixel inserting position is dispersed.

FIGS. 21a, 21b and 21c are explanatory diagrams illustrating an example of a case in which an isolating point is generated by carrying out density correction on the inserted pixel.

DETAILED DESCRIPTION OF THE PREFERRED EMBODIMENTS

Hereafter, although a preferred embodiment of the present invention will be described in detail, the present invention is not limited to the embodiment.

Figure 1:
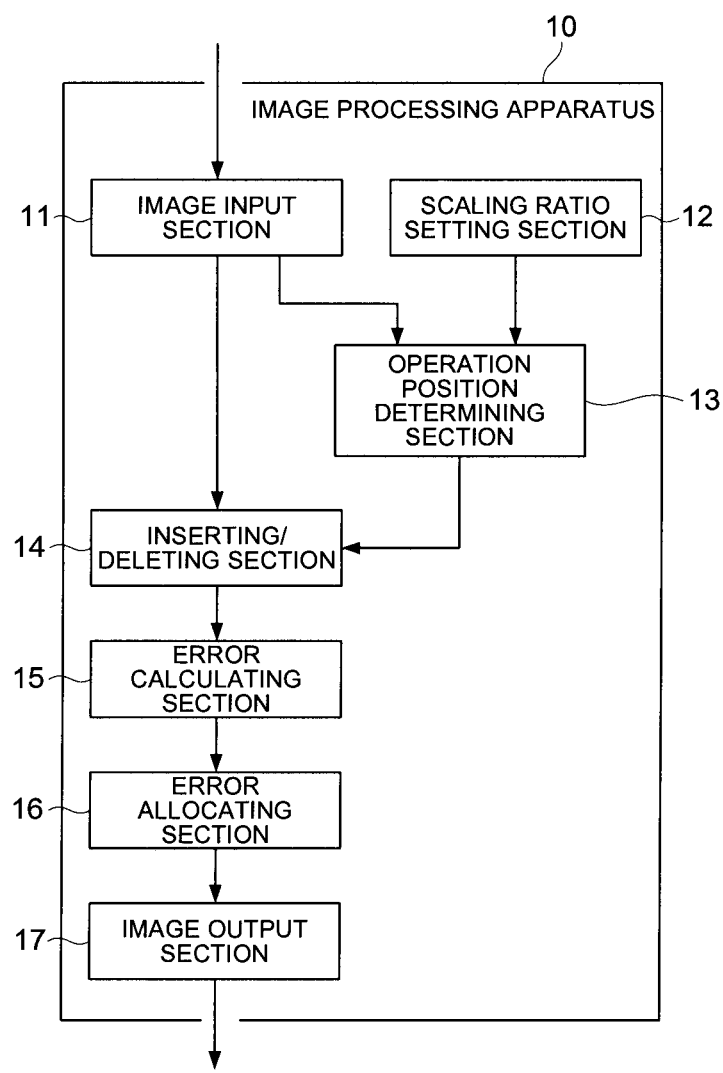
FIG. 1 is a block diagram schematically illustrating a configuration of an image processing apparatus according to a preferred embodiment of the present invention.

FIG. 1 is a block diagram schematically illustrating a configuration of image processing apparatus 10 according to a preferred embodiment of the present invention. Image processing apparatus 10 is provided with functions of outputting an input image by enlarging or reducing the input image in accordance with a designated scaling ratio. Image processing apparatus 10 includes functions of, but is not limited to, image input section 11, scaling ratio setting section 12, operation position determining section 13, inserting/deleting section 14, error calculating section 15, error allocating section 16, and image output section 17.

Image input section 11 is configured to input image data of an image that is to be scaled. The input image data that is to be scaled is a two-dimensional image wherein pixels have been arranged both in a main scanning direction and a sub-scanning direction perpendicular to each other in a matrix form. Each pixel is a multiple gradation-level pixel, and the level is made to be in a range from 0 to 256 gradations, in this embodiment Scaling ratio setting section 12 is configured to receive instructions of scaling ratio, operation position determining section 13 is configured to determine a pixel operation position, which is an inserting position or a deleting position of pixel, in accordance with a scaling ratio which has been designated by scaling ratio setting section 12. Here, as illustrated in FIG. 19a, pixel operation positions are determined by dispersing the positions with a predetermined arrangement pattern. The arrangement pattern is not limited to the pattern illustrated in FIG. 19a, and may have a variety of patterns. The pixel operation positions may be dispersed in a random manner to avoid periodicity.

Inserting/deleting section 14 is configured to insert pixels to the pixel operation positions, or delete pixels from the pixel operation positions having been determined via operation position determining section 13. Error calculating section 15 is configured to calculate a density difference, as an error (error value), between densities of the vicinity of the pixel, which has been inserted or deleted via the step of inserting/deleting a pixel, before and after the insertion or deletion is carried out Error allocating section 16 is configured to allocate the error, having been calculated via error calculating section 15, to "the inserted pixel" and "pixels in the vicinity of the inserted or deleted pixel". Image output section 17 is configured to output an image wherein allocation processing of the error has been completed via error allocating section 16.

Error allocating section 16 allocates the error in such a manner that pixel value, after allocation of the error, of pixel of allocation destination to which the error has been allocated, falls within a allowable range which is estimated from pixel values of pixels near the pixel. In other words, error allocating section 16 allocates the error within a range in which a pixel after the allocation of the error does not become an isolated point with respect to pixels surrounding that pixel. The allowable range is determined based on an estimate value which is obtained by estimating pixel value of a pixel of allocation destination from pixels surrounding that pixel by using a variety of interpolation algorithms. For example, the allowable range is determined within an appropriate range based on a plurality of estimated values estimated by the nearest neighbor method and interpolation methods based on spline functions.

Note that image processing apparatus 10 may be configured of hardware dedicated thereto. Also, the same functions of image processing apparatus 10 may be achieved by executing a prescribed program in an information processing apparatus provided with a CPU (Central Processing Unit), memory devices, and the like.

Next, a scaling operation of image processing apparatus 10 will be described in detail.

Figure 2:
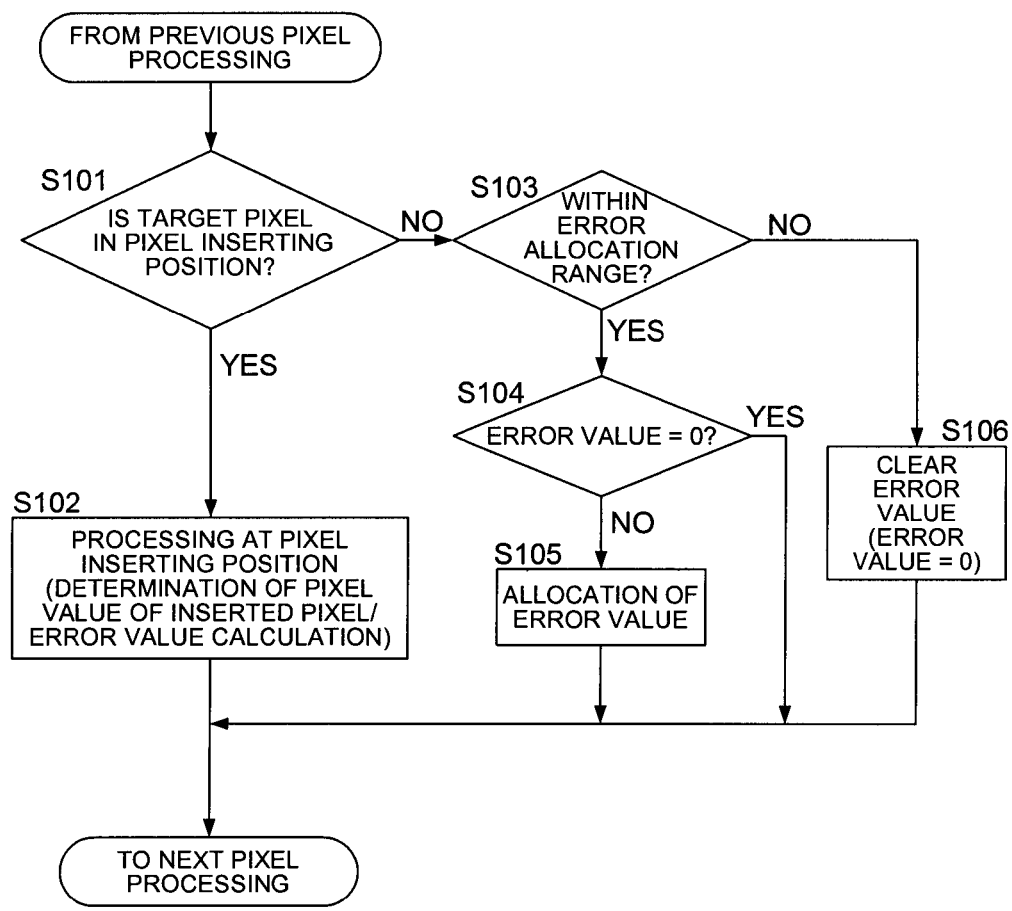
FIG. 2 is a flow chart illustrating an enlarging processing carried out by an image processing apparatus according to a preferred embodiment of the present invention.

FIG. 2 is a flow chart illustrating a process flow at the time of image enlargement. Here, by considering one pixel at the top left of a two-dimensional image as an initial point, image processing apparatus 10 performs the processing by shifting in sequence the target pixel from the pixel at the left periphery to the right in the main scanning direction, and when the target pixel has reached at right periphery, the target pixel returns to the left periphery and is shifted one pixel downward in the sub-scanning direction. By repeating this operation to perform the processing by shifting the target pixel in sequence from the pixel at the left periphery to the right in the main scanning direction, the scaling processing is applied to the entire two-dimensional image. Also, an image is enlarged in the sub-scanning direction.

If the target pixel is a pixel of a pixel inserting position (pixel operation position) having been determined by operation position determining section 13 (step S101; YES), a pixel inserting position processing is carried out (step S102).

Figure 3:
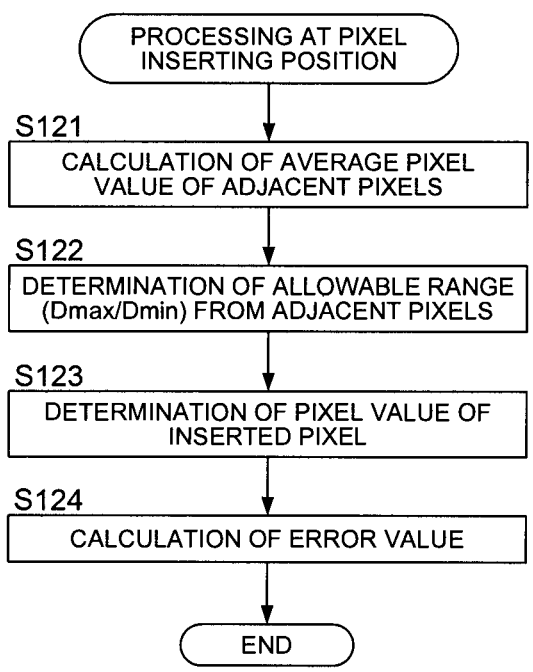
FIG. 3 is a flow chart illustrating details of a pixel inserting position processing (step S102 in FIG. 2).

FIG. 3 is a flow chart illustrating details of the pixel inserting position processing (step S102 in FIG. 2). In the pixel inserting position processing, a pixel is inserted at the pixel inserting position, and also, a pixel value of the inserted pixel is determined, and further, a density difference between densities of the vicinity of the inserted pixel before and after the insertion, is calculated as an error (error value). In cases in which the vicinity is made as a one-dimensional area, then, the direction of the one-dimension is made to the same direction of scaling direction. In this preferred embodiment, an image is enlarged in the sub-scanning direction, and therefore, the vicinity is made as the area to be extended in the direction of enlargement, and the area is made as the area of three pixels above and below the inserted pixel for a total of 6 pixels. First of all, an average value of pixels in the vicinity of the inserted pixel (referred to as "average pixel value of adjacent pixels") is calculated (step S121).

Next, the allowable range of pixel value of an inserted pixel is set (step S122). Here, a higher pixel value of adjacent pixels above and below the target pixel is set as Dmax, and a lower pixel value of adjacent pixels above and below the target pixel is set as Dmin, and the allowable range is set as a range defined by Dmax as a maximum value and by Dmin as a minimum value. Note that if pixel values of adjacent pixels above and below the target pixel are the same, then Dmax=Dmin.

A pixel is inserted at the pixel inserting position, and a pixel value is assigned to the inserted pixel based on the following rule (step S123).

Condition A: A case in which the average pixel value of adjacent pixels is more than Dmax, then Dmax is assigned to the inserted pixel.

Condition B: A case in which the average pixel value of adjacent pixels is less than Dmin, then Dmin is assigned to the inserted pixel.

If neither condition A nor B applies, in other words, if Dmax≥the average pixel value of adjacent pixels≥Dmin, then "the average pixel value of adjacent pixels" is assigned to the inserted pixel.

Next, an error value is calculated by the following equation (step S124).

(Error value)=(Average pixel value of adjacent pixels)−(Pixel value assigned to the inserted pixel)

Note that the error value is maintained until the pixel adjacent to the lower side of the inserted pixel becomes a target pixel.

Referring again to FIG. 2, the explanations are continued. If the target pixel is not a pixel of the pixel inserting position (pixel operation position) having been determined via operation position determining section 13 (step S101: NO), determination is made whether or not such target pixel exists within either one of the error allocation range of pixel inserting positions (step S103).

Figure 4:
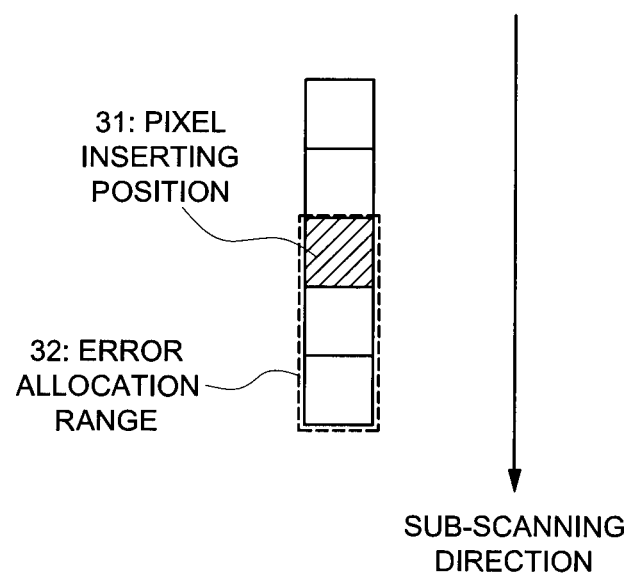
FIG. 4 is an explanatory diagram illustrating a one-dimensional error allocation range.

Here, as illustrated in FIG. 4, a predetermined range (range that is surrounded by dotted lines of FIG. 4) in the lower side of pixel inserting position 31 in the sub-scanning direction, is referred to as error allocation range 32. In this case, in step S103, determination is made whether or not the target pixel exists within the error allocation range of inserted pixel in the upper side in the sub-scanning direction. In other words, when the target pixel is a pixel in the pixel inserting position in the upper side in the sub-scanning direction, processing from step S103 to step S106 are carried out with respect to the error value generated by the inserted pixel.

In cases in which the target pixel does not exist within the error allocation range of the pixel inserting position (step S103: NO), the error value is cleared to zero (step S106). In this case, the processing with respect to the target pixel has been completes and proceeds to processing for the next pixel.

In cases in which the target pixel exists within the error allocation range of the pixel inserting position (step S103: YES), determination is made whether the error value with respect to the inserted pixel is zero (step S104). If the error value is zero (step S104: YES), the processing with respect to the target pixel has been completed and proceeds to processing for the next pixel.

In cases in which the error value is not zero (step S104: NO), an error value allocation processing to allocate the error value to such target pixel is carried out (step S105). Note that the error value is updated to an unallocated remaining value each time when an error value has been allocated to any pixel.

Figure 5:
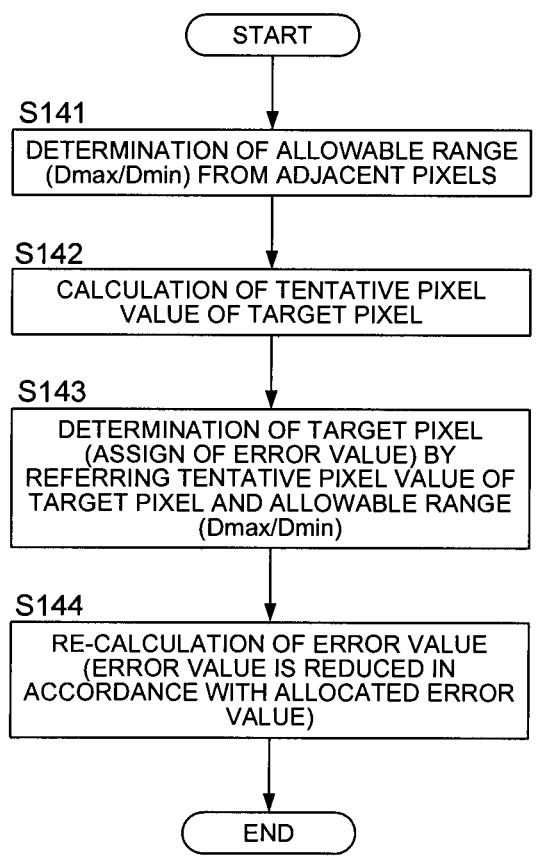
FIG. 5 is a flow chart illustrating details of an error value allocation processing (step S105 in FIG. 2).

FIG. 5 is a flow chart illustrating details of the error value allocation processing (step S105 in FIG. 2). First of all, an allowable range of pixel value of the inserted pixel (pixel of allocation destination to which an error is allocated) is set (step S141). Here, a higher pixel value of adjacent pixels above and below the target pixel is set as Dmax, and a lower pixel value of adjacent pixels above and below the target pixel is set as Dmin, and the allowable range is set as a range defined by Dmax as a maximum value and by Dmin as a minimum value. Note that if pixel values of adjacent pixels above and below the target pixel are the same, then Dmax=Dmin.

Next, a tentative pixel value of the target pixel is calculated as follows (step S142)

(Tentative pixel value of the target pixel)=(Error vale)+(Pixel value of the target pixel).

The tentative pixel value of the target pixel is the pixel value of the target pixel in cases when the entire remaining error value is allocated to the target pixel.

Pixel value is allocated to the target pixel based on the following rule (step S143).
Condition C: In cases in which the tentative pixel value of the target pixel is larger than Dmax, then Dmax is assigned to the target pixel.
Condition D: In cases in which the tentative pixel value of the target pixel is less than Dmin, then Dmin is assigned to the target pixel.

If neither condition C nor D applies, in other words, if Dmax≥the tentative pixel value of the target pixel≥Dmin, then "the tentative pixel value of the target pixel" is assigned to the inserted pixel.

Next, an error value is updated by the following equation (step S144).

(Error value)=(Tentative pixel value of the target pixel)−(Pixel value assigned to the target pixel)

Note that the error value is maintained until the pixel adjacent to the lower side of the inserted pixel becomes a target pixel.

In cases in which step S103 in FIG. 2 is NO, an unallocated error value remains. However, since in the case when a pixel to which an error is to be allocated is not in the vicinity, it is not necessary to allocate the error forcedly. In other words, the purpose of allocation of the error, by its nature, is to correct a local density error in the vicinity of pixel inserting position, and therefore, the improvement effect of unevenness in density is small in cases when a pixel to which an error is to be allocated is not in the vicinity. Therefore, error allocation is terminated outside the error allocation range.

Also, it is preferable that the error allocation range be set within the vicinity of which the average pixel value of adjacent pixels has been calculated in step S121 in FIG. 3. This is because it is not preferable to allocate an error to a pixel far distance from the inserted pixel. Particularly, because the difference between densities of the average pixel value of adjacent pixels before and after the pixel insertion is set as a difference value, the difference value has no relationship with pixels outside the reference range (the vicinity) at the time of calculation of the average pixel value of adjacent pixels, and it is preferable that the error allocation range be set within the reference range (the vicinity) of calculation of the average pixel value of adjacent pixels.

Next, enlarging processing, carried out by image processing apparatus 10, will be described by using a specific image as an example. FIG. 6a illustrates an example of an original image before the enlarging processing and also illustrates pixel inserting positions. FIG. 6b illustrates allocation of a pixel value to the inserted pixel via the processing in step S102 in FIG. 2

As an example, in the case of inserted pixel P3, the average pixel value of adjacent pixels is (255+255+0+0+0+255)/6=128, the range of the pixel values of adjacent pixels above and below the target pixel is from 0 to 0, and therefore, Dmax=0 and Dmin=0. Therefore, condition A is established and then, (Pixel value of the inserted pixel)=0. Also, (Error value)=(Average pixel value of adjacent pixels−(Pixel value of the inserted pixel)=128−0=128.

FIGS. 7a and 7b each is an explanatory diagram illustrating allocation of an error value to pixels (pixels within the error allocation range) downward in the sub-scanning direction with respect to inserted pixel P3 in FIG. 6b. As calculated in FIG. 6b, the unallocated error value is 128. To begin with, allocation processing (the processing in FIG. 5) is carried out with respect to pixel U1 which is one pixel below inserted pixel P3 in the sub-scanning direction (FIG. 7a). In this case, the range of the pixel values of adjacent pixels above and below the target pixel is from 0 to 0, and therefore Dmax=0 and Dmin=0. Because (Tentative pixel value of the target pixel)=(Error value)+(Pixel value of the target pixel)=128, condition C is established (tentative pixel value of the target pixel is outside the allowable range which is estimated from the pixel values of adjacent pixels above and below the target pixel). Therefore, (Pixel value of the target pixel)=0 (no allocation of error), (Error value)=(Tentative pixel value of the target pixel)−(Pixel value of the target pixel)=128−0=128.

Next, allocation processing (the processing in FIG. 5) is carried out with respect to pixel U2 which is one more pixel below (namely, two pixels below) from inserted pixel P3 in the sub-scanning direction (FIG. 7b). In this case, the range of the pixel values of adjacent pixels above and below the target pixel is from 0 to 255, and therefore Dmax=255 and Dmin=0. Because (Tentative pixel value of the target pixel)=(Error value)+(Pixel value of the target pixel)=128, neither condition C nor condition D is established (tentative pixel value of the target pixel is within the allowable range which is estimated from the pixel values of adjacent pixels above and below the target pixel). Therefore, (Pixel value of the target pixel)=128, (Error value)=(Tentative pixel value of the target pixel)−(Pixel value of the target pixel)=128−128=0. Then, the allocation of error value is complete.

FIG. 8 is an explanatory diagram illustrating a state when a scaling processing with respect to the original image illustrated in FIG. 6 has been completed, in other words, an explanatory diagram illustrating an enlarged image after allocation of the error value has been complete. The image has been enlarged so that local densities in the vicinity of the inserted pixels coincide before and after pixel insertion without generating isolated points.

Next, a case of reduction scaling will be described.

Figure 9:
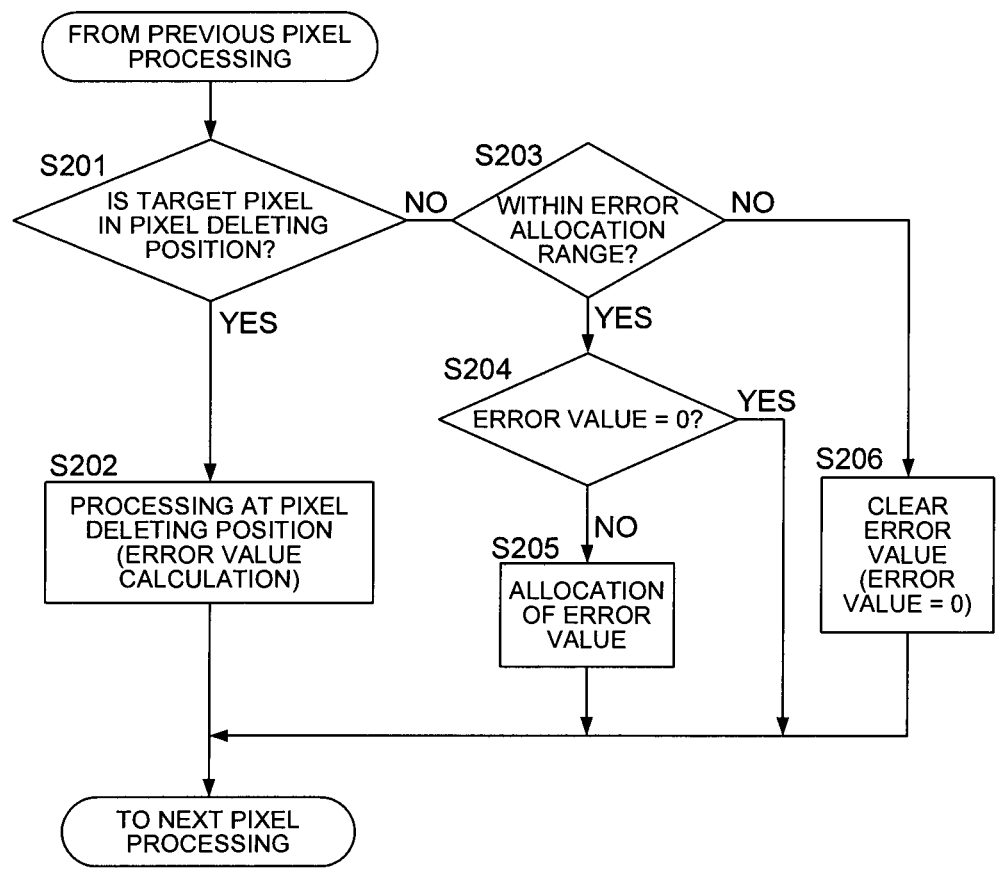
FIG. 9 is a flow chart illustrating a reducing processing carried out by an image processing apparatus according to a preferred embodiment of the present invention.

FIG. 9 illustrates a process flow at the time of image reduction. Similar to the process flow at the time of image enlargement, by considering one pixel at the top left of a two-dimensional image as an initial point, image processing apparatus 10 performs the processing by shifting the target pixel in sequence from the pixel at the left periphery to the right in the main scanning direction, and when the target pixel has reached the right periphery, the target pixel returns to the left periphery and is shifted one pixel downward in the sub-scanning direction. By repeating this operation to perform the processing by shifting in sequence the target pixel from the pixel at the left periphery to the right in the main scanning direction, the scaling (reduction) processing is applied to the entire two-dimensional image.

FIG. 9 illustrates a process flow with respect to a target pixel. In cases in which a target pixel is the pixel of the pixel deleting position (pixel operation position), having been determined via operation position determining section 13 (step S201: YES), pixel deleting position processing is carried out (step S202).

Figure 10:
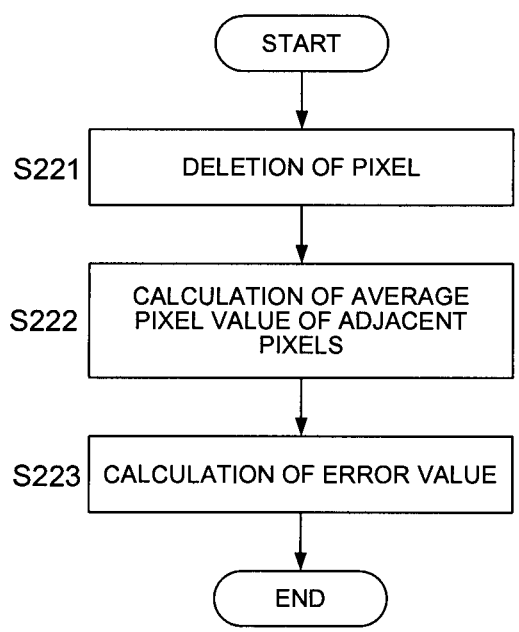
FIG. 10 is a flow chart illustrating details of a processing of pixel deleting position (step S202 in FIG. 9).

FIG. 10 is a flow chart illustrating details of a pixel deleting position processing (step S202 in FIG. 9). In the pixel deleting position processing, the pixel at the pixel deleting position is deleted (step S221), and also, a density difference between densities in the vicinity of the deleted pixel before and after the deletion, is calculated as an error (error value). In this example, an image is reduced in the sub-scanning direction, and therefore, the vicinity is made as the area to be reduced in the direction of reduction, and the area is made as the area of three pixels above and below the deleted pixel for a total of 6 pixels. First of all, an average value of pixels (referred to as "average pixel value of adjacent pixels") in the vicinity (three pixels above and below the deleted pixel for a total of 6 pixels, in this example) of the deleted pixel is calculated (step S222).

Next, an error value is calculated by the following equation (step S223).

(Error value)=(Average pixel value of adjacent pixels)−(Pixel value of the deleted pixel).

This error value is the density error generated by the pixel deletion. If the error value is a positive value, local density is decreased by deleting the pixel to be deleted. If the error value is a negative value, local density is increased by deleting the pixel to be deleted. Note that the error value is maintained until the pixel adjacent below the deleted pixel becomes a target pixel.

Referring again to FIG. 9, the explanations are continued. If the target pixel is not a pixel of the pixel deleting position (pixel operation position) having been determined via operation position determining section 13 (step S201: NO), determination is made whether or not such target pixel exists within either one of the error allocation range of pixel deleting positions (step S203). The error allocation range is similar to that of the case of pixel insertion.

In cases in which the target pixel does not exist within the error allocation range of the pixel deleting position (step S203: NO), the error value is cleared to zero (step S206). In this case, the processing with respect to the target pixel has been completed and proceeds to processing for the next pixel.

In cases in which the target pixel exists within the error allocation range of the pixel deleting position (step S203: YES), determination is made whether the error value with respect to the deleted pixel is zero (step S204). If the error value is zero (step S204: YES), the processing with respect to the target pixel has been completed and proceeds to processing for the next pixel.

In cases in which the error value is not zero (step S204: NO), an error value allocation processing to allocate the error value to such target pixel is carried out (step S205). Note that the error value is updated to unallocated remaining value each time when the error value has been allocated to any pixel.

The error allocation processing is similar to that of the case of pixel insertion, and the process flow of FIG. 5 is carried out. Even in cases of pixel deletion, an unallocated error value remains in cases in which step S203 in FIG. 9 is NO. However, since it is the case when a pixel to which an error is to be allocated is not in the vicinity, it is not necessary to force allocation of the error. In other words, the purpose of allocation of the error, by its nature, is to correct a local density error in the vicinity of pixel deleting position, and therefore, in cases in which when a pixel to which an error is to be allocated is not in the vicinity, the unallocated error may be ignored.

Also, it is preferable that the error allocation range be set within the vicinity of which the average pixel value of adjacent pixels has been calculated at step S222 in FIG. 9. This is because it is not preferable to allocate an error to a pixel far distance from the deleted pixel. Specifically, because the difference between densities of the average pixel value of adjacent pixels before and after the pixel deletion is set as a difference value, the difference value has no relationship with pixels of outside the reference range (vicinity) at the time of calculation of the average pixel value of adjacent pixels, and it is preferable that the error allocation range be set within this vicinity.

Next, a reducing processing carried out by image processing apparatus 10 will be described by using a specific image as an example. FIG. 11a illustrates an example of an original image before the reducing processing and also illustrates pixel deleting positions. FIG. 11b illustrates a state when an error value has been calculated by deleting the pixels of pixel deleting positions via the processing in step S202 in FIG. 9.

As an example, in the case of inserted pixel P5, the average pixel value of adjacent pixels is (255+255+0+0+255+255)/6=170, and (pixel value of deleted pixel)=0. Therefore, (Error value)=(Pixel value of deleted pixel)−(Average pixel value of adjacent pixels)=0−170=−170.

Figure 12A:
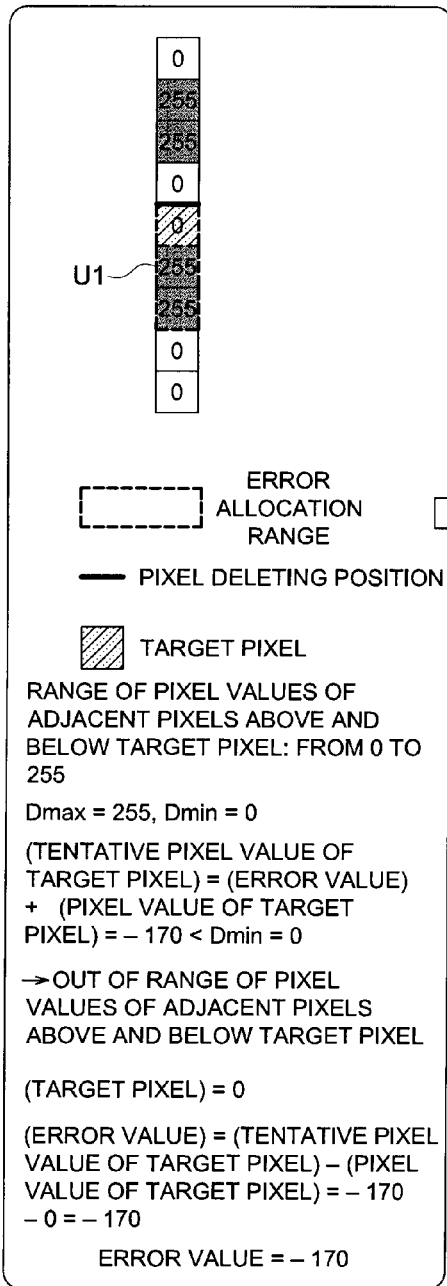
FIGS. 12a and 12b are explanatory diagrams illustrating the continuation of FIGS. 11a and 11b (error value allocation).

FIGS. 11a and 11b each is an explanatory diagram illustrating allocation of the error value to pixels below in the sub-scanning direction with respect to inserted pixel P5 in FIG. 11a. As calculated in FIG. 11b, unallocated error value is "−170". To begin with, allocation processing (the processing of FIG. 5) is carried out with respect to pixel U1 which is one pixel below the pixel deleting position in the sub-scanning direction (FIG. 12a). In this case, the range of the pixel values of adjacent pixels above and below the target pixel is from 0 to 255, and Dmax=255 and Dmin=0. Because (Tentative pixel value of the target pixel)=(Error value)+(Pixel value of the target pixel)=−170, condition D is established (tentative pixel value of the target pixel is outside the allowable range which is estimated from the pixel values of adjacent pixels above and below the target pixel). Therefore, (Pixel value of the target pixel)=0 (no allocation of error), (Error value)=(Tentative pixel value of the target pixel)−(Pixel value of the target pixel)=−170−0=−170.

Figure 12B:
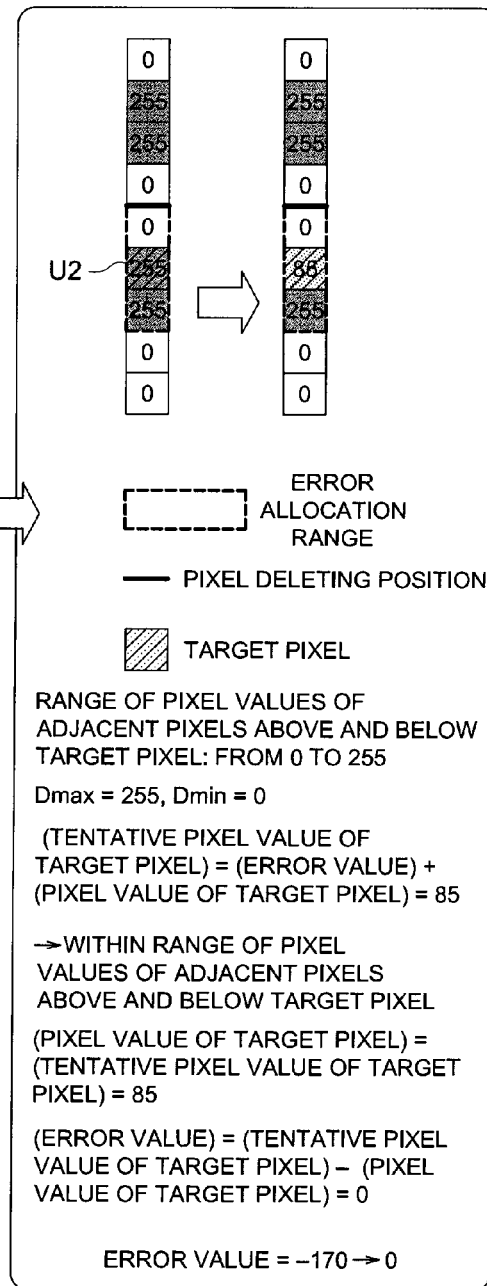

Next, allocation processing (the processing of FIG. 5) is carried out with respect to pixel U2 which is one more pixel below (namely, two pixels below) from the deleted pixel in the sub-scanning direction (FIG. 12b). In this case, the range of the pixel values of adjacent pixels above and below the target pixel is from 0 to 255, and therefore Dmax=255 and Dmin=0. Because (Tentative pixel value of the target pixel)= (Error value)+(Pixel value of the target pixel)=−170+255=85, neither condition C nor condition D is established (tentative pixel value of the target pixel is within the allowable range which is estimated from the pixel values of adjacent pixels above and below the target pixel). Therefore, (Pixel value of the target pixel)=(Tentative pixel value of the target pixel) =85, (Error value)=(Tentative pixel value of the target pixel)−(Pixel value of the target pixel)=85−85=0. Then, the allocation of error is complete.

FIG. 13 is an explanatory diagram illustrating a state when a scaling (reduction) processing with respect to the original image illustrated in FIG. 11 is complete, in other words, an explanatory diagram illustrating a state when allocation of error value is complete by deleting the pixels. The image has been reduced so that local densities in the vicinity of the deleted pixels coincide before and after the pixel deletion, without generating isolated points.

Next, a modification of error allocation will be described.

In the processing illustrated in FIGS. 2 and 9, the error value is updated by subtracting the allocated value. In this modified processing, the error value is updated in accordance with a distance, from the pixel inserting position or pixel deleting position, increases. For a pixel farther away from the pixel inserting position or pixel deleting position, an error value, which is obtained by further reducing the unallocated error value, is assigned as the updated error value. In other words, because the improvement effect of unevenness in density becomes smaller even if the error is allocated as the distance from the pixel inserting position, or pixel deleting position, increases, the necessity of error allocation decreases. Thus, the error value to be allocated is reduced as a distance from the pixel inserting position, or pixel deleting position, increases.

Figure 14:
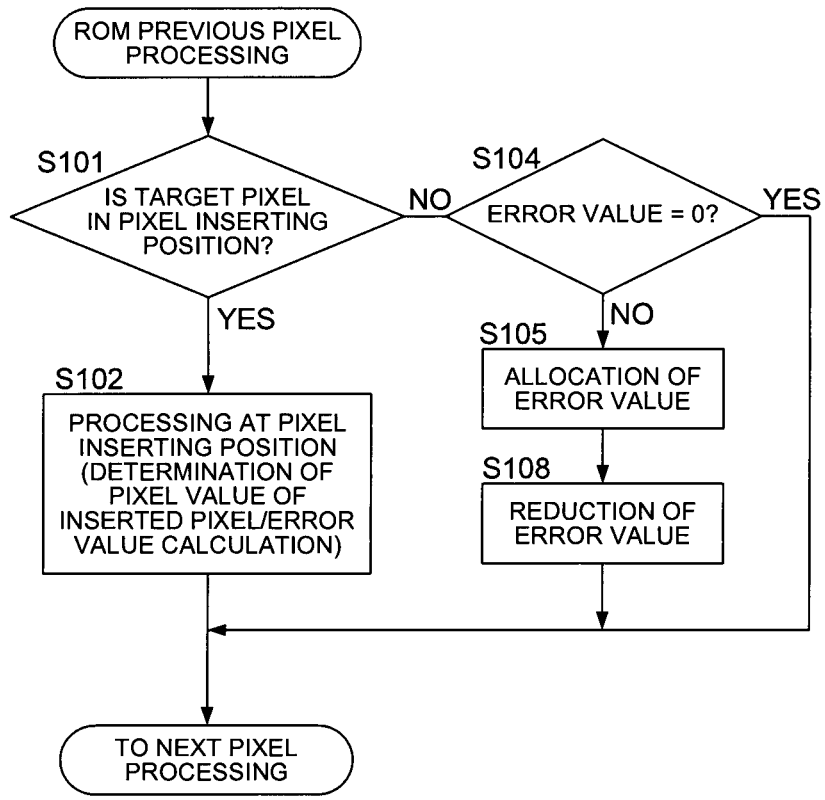
FIG. 14 is a flow chart illustrating a processing in a case in which an error value is reduced as the distance from the pixel inserting position, or pixel deleting position, increases.

FIG. 14 is a flow chart illustrating a scaling (enlargement) process flow in a case in which an error value is reduced. As a substitute for the process of FIG. 2, the process of FIG. 14 is carried out In FIG. 14, for the processing the same as that of FIG. 2, the same step numerals are assigned.

At step S108, the remaining error value, which has not been allocated via the error value allocation processing, is multiplied by a constant number (as an example, 0.8), and is maintained as the error value for the next pixel to be processed which is one pixel below in the sub-scanning direction. The method for reducing error value by "(Error value for the next pixel to be processed)=(The remaining error value which has not been allocated via the error value allocation processing)× 0.8", is not limited to methods in which a constant number is multiplied, and methods in which a constant number is subtracted may also be applied. Further, methods, in which an reduction characteristic of error value is set with respect to the distance from the pixel inserting position and pixel deleting position by setting the error value which has been obtained firstly at the time of pixel insertion or deletion as the initial value, and the unallocated error value is reduced to the value exhibited by the reduction characteristic in a case in which the unallocated error value exceeds the reduction characteristic value.

Note that step S108 of FIG. 14 may be added underneath step S105 of FIG. 2. Then, the process becomes a process in which the restriction to error allocation range and the reduction of unallocated error value is combined. Also, while an enlarging processing has been mainly explained as an example in the above, a similar argument applies to a reducing processing. In the case of reducing processing, steps S101, S102, S104 and S105 in FIG. 14 may be replaced with steps S201, S202, S204, and S205 in FIG. 9.

Next, a modification of the method of calculating an allowable range, which is estimated from pixel values of pixels adjacent to the pixel of error allocation destination, will be described.

In the examples having been explained hitherto, the explanations have been made with respect to the case in which the allowable range is determined from an estimate based on the nearest neighbor method. Namely, the example has been explained in which a higher pixel value of adjacent pixels above and below the target pixel is set as Dmax, and a lower pixel value of adjacent pixels above and below the target pixel is set as Dmin, and the allowable range is set as a range defined by Dmax as a maximum value and by Dmin as a minimum value. However, the allowable range is not limited thereto.

Figure 15A:
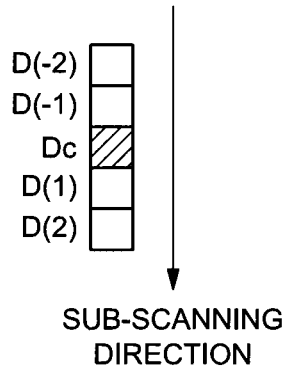
FIGS. 15a and 15b are explanatory diagrams illustrating an example of determining an allowable range based on an estimated value obtained by a nearest neighbor method and an estimated value obtained by a spline interpolation.
Figure 15B:
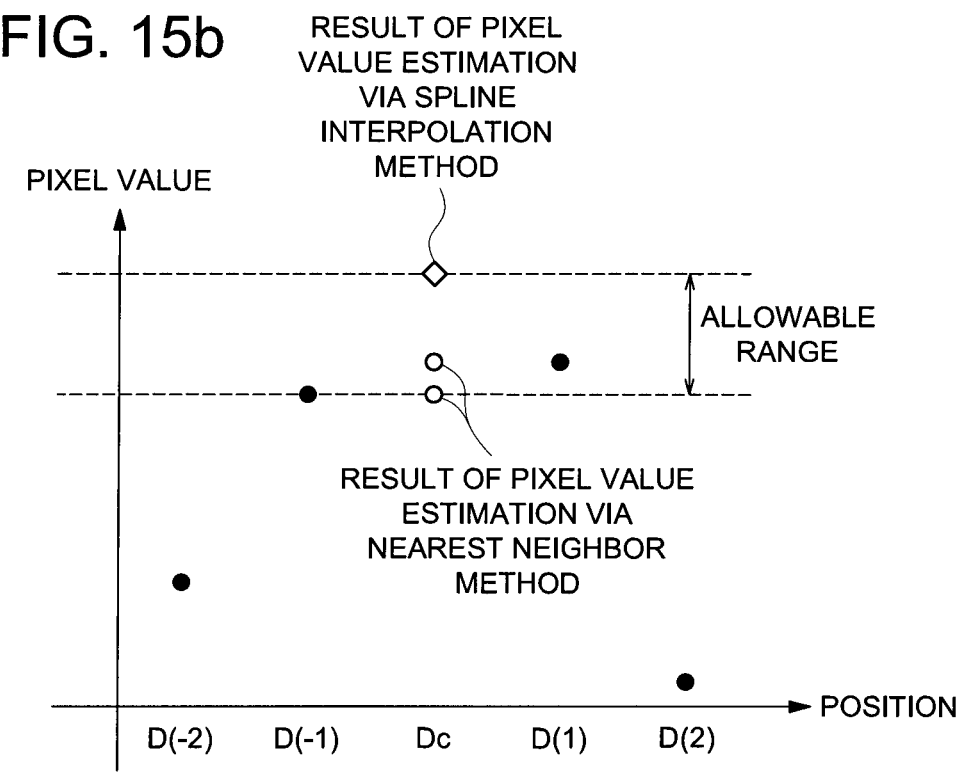

As an example, an allowable range may be determined based on an estimated value obtained by a nearest neighbor method and an estimated value obtained by a spline interpolation method. FIGS. 15a and 15b illustrate this example. In this example, as illustrated in FIG. 15a, the pixel of error allocation destination (set as a target pixel) is assumed as Dc, and pixel D(−1) which is adjacent to the upper side of D(−1) in the sub-scanning direction, pixel D(−2) which is adjacent to the upper side of D(−1) in the sub-scanning direction, D(1) which is adjacent to the lower side of Dc in the sub-scanning direction, and D(2) which is adjacent to the lower side of D(1) in the sub-scanning direction, are assumed as adjacent pixels. FIG. 15b illustrates the relationship among each pixel value of the target pixel and adjacent pixels, pixel values estimated from adjacent pixels, and the allowable range.

In the case of the spline interpolation method, by means of weight interpolation processing from pixel values of adjacent pixels in one-dimensional direction (D(−2), D(−1), D(1), D(2)), pixel value of target pixel (Dc) is estimated by the following equation.

$$Dc = Km2 \times D(-2) + Km1 \times D(-1) + Kp1 \times D(1) + Kp2 \times D(2)$$

Km2, Km1, Kp1, and Kp2 are the weight coefficients, and the following values are typical in cases in which, for example, spline interpolation is carried out:
Km2=−3/16, Km1=11/16, Kp1=11/16, Kp2=−3/16.
In cases in which adjacent pixels are D(−2)=45, D(−1)=180, D(1)=200, D(2)=2, Dc is calculated from the above-mentioned equation as Dc=252.

In cases of pixel vale estimation via a nearest neighbor method, the nearest neighbor pixel is D(−1) or D(1), and the estimated pixel value of Dc=180 or 200.

Therefore, the estimated pixel values obtained from the nearest neighbor method and the spline interpolation method are 180 or 200, and 252, and in cases in which the allowable range is set as a range defined by maximum value and minimum value of these estimated values, the allowable range is from 180 to 252.

Note that a range, where some margins are left for the allowable range obtained from the estimated values calculated via the interpolation method, may be set as a final allowable range. As an example, in cases in which an allowable range, defined from a plurality of interpolation methods, is a range from 180 to 210, a final allowable range may be set as a range from 177 to 213 by having a 10% margins for the allowable range. The margins may be applied to a range obtained from a single interpolation method (as an example, Dmax and Dmin obtained from the nearest neighbor method). Also, the margins are not limited to 10%, and may be set to an appropriate value.

Next, a modification will be described in which the vicinity to obtain the average pixel value of adjacent pixels, and error allocation range to allocate error value, are made as a two-dimensional area.

Figure 16A:
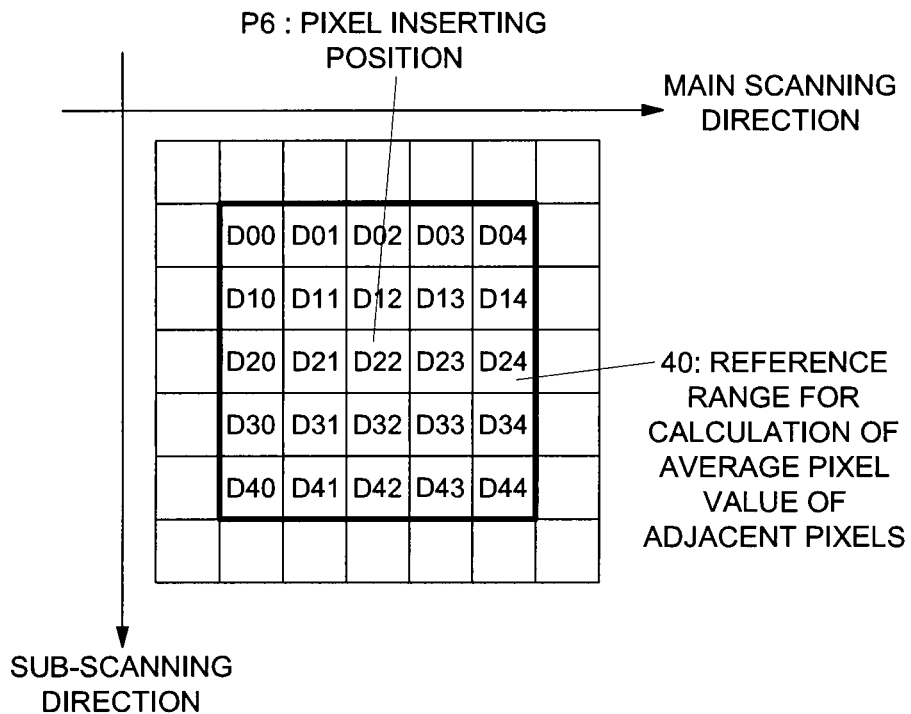
FIGS. 16a and 16b are explanatory diagrams illustrating an example in which a reference range of calculation of the average pixel value of adjacent pixels is a two-dimensional region.
Figure 16B:
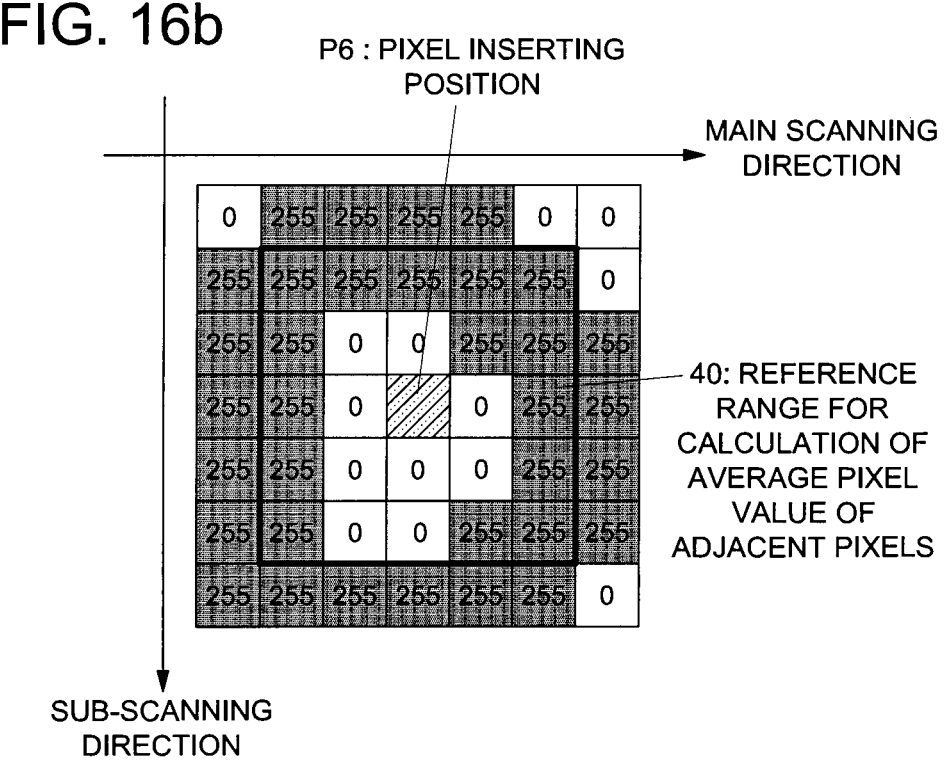

A reference range of the cases, in which the average pixel value of adjacent pixels adjacent to the pixel inserting position and pixel deleting position are calculated at step S121 in FIG. 3 and step S222 in FIG. 10, may extend in two dimensions. As an example, as illustrated in FIGS. 16a and 16b, the average pixel value of adjacent pixels may be calculated by assuming a range of 5 pixels×5 pixels with pixel inserting position P6 (D22) as its center as reference range 40. In the case of the image in FIG. 16b, (Average pixel value of adjacent pixels)=(D00+D01+ ... +D44)/25=153.

Figure 17A:
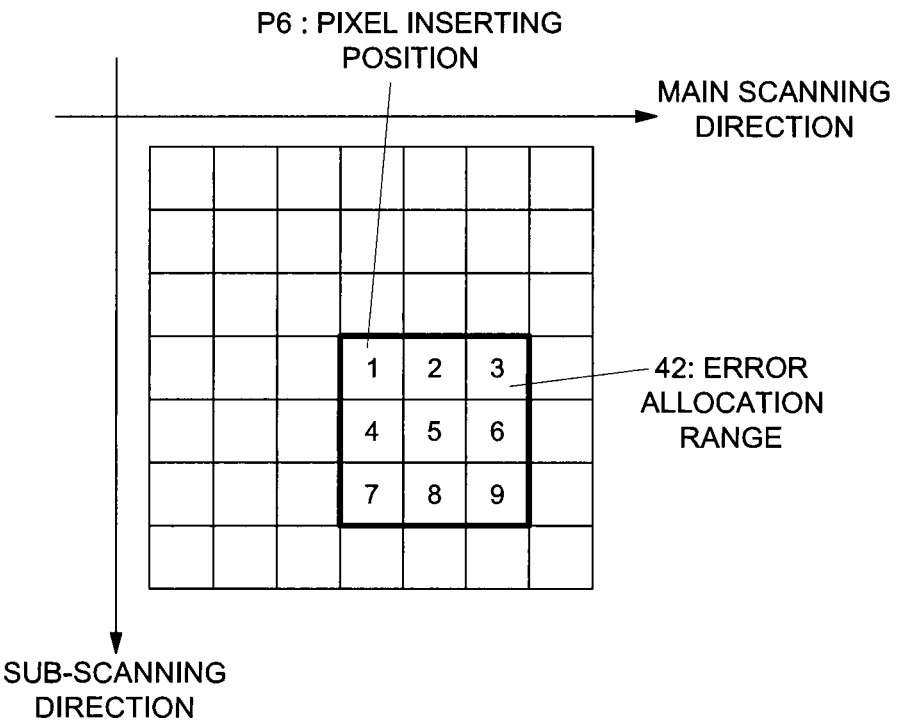
FIGS. 17a and 17b are explanatory diagrams illustrating an example in which an error allocation range is a two-dimensional region.

Also, as illustrated in FIG. 17a, error allocation range 42 may be set as a two-dimensional area. The allocation order, by considering scanning direction (the order to shift the target pixel), may preferably be set as illustrated in FIG. 17a (the number shown on each pixel is the order of allocation).

Figure 17B:
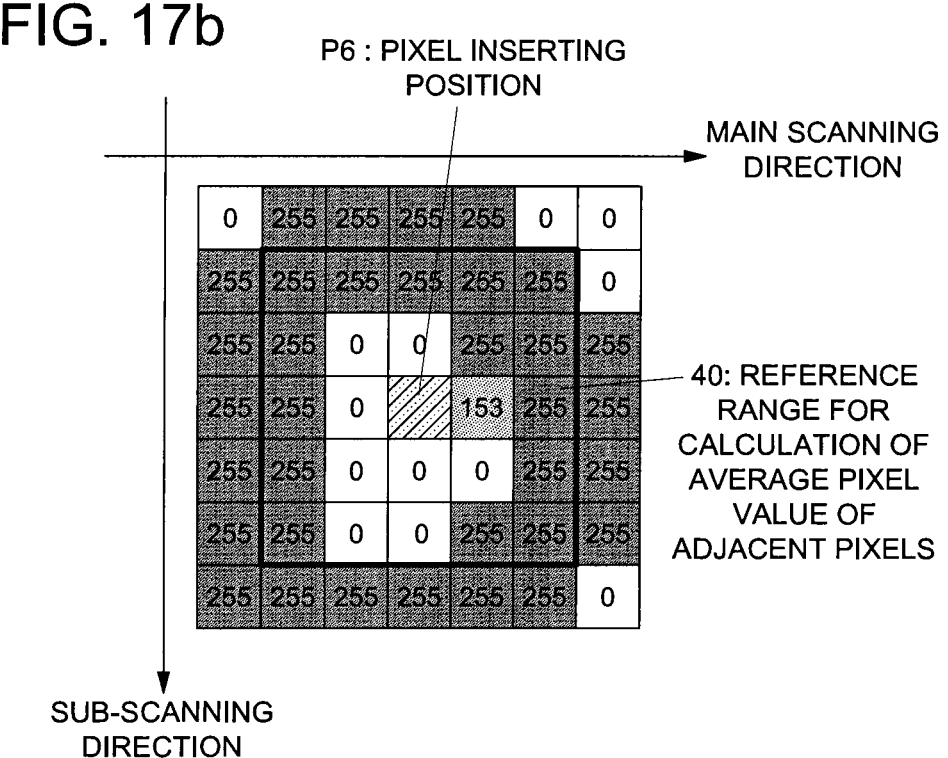

As an example, pixel P6 in FIG. 17b is set as the inserting pixel, the average pixel value of adjacent pixels is set at 153, and the allowable range (Dmax, Dmin) is to be determined from adjacent pixels at the upper and lower sides of the inserting pixel in the sub-scanning direction via the nearest neighbor method. In this case, the pixel value of the pixel of allocation order 1 is Dmax=Dmin=0, and therefore, the pixel value cannot be allocated because the average pixel value of adjacent pixels is 153. In the case of the next pixel of allocation order 2, because Dmax=255 and Dmin=0, the average pixel value of adjacent pixels (=error value) becomes allocatable, and the entire error value is allocated to the pixel of allocation order 2.

Note that, when the error value is set to 0 because the pixel inserting position is outside the error allocation range (steps S106 and S206), in the case in which the error allocation range and allocation order are the examples illustrated in FIG. 17a, if a remaining error value exists even when error allocation processing has been carried out until the pixel of allocation order 9, the remaining error value may be cleared to 0.

In such a way, by extending reference range 40 and error allocation range 42, for calculating the average pixel value of adjacent pixels, in two dimensions, the error can be allocated to the pixels comparatively neighboring with the inserted pixel (or deleted pixel), thus, density error reduction effect is increased.

Although the preferred embodiment of the present invention have been fully described by way of examples with reference to the accompanying drawings, it is to be noted that various changes and modifications will be apparent to those skilled in the art. Therefore, unless such changes and modifications depart from the scope of the present invention, they are to be construed as being included therein.

In the preferred embodiment, a processing example has been described, wherein an error value is allocated downward (downward in the sub-scanning direction) from pixel inserting position or pixel deleting position on the assumption that image streaming is carried out from the top to the bottom. However, in cases in which image streaming is carried out from the bottom to the top, the error or value may be allocated upward in the image.

Also, in the preferred embodiment, although an example has been described, wherein enlargement/reduction (scaling) is carried out in the sub-scanning direction, the present invention can also be applied to cases wherein scaling is carried out in the main-scanning direction. In this case, if the reference range and the error allocation range for calculating the average pixel value of adjacent pixels is one dimension, the direction of the one dimension may be set to the same direction of scaling, in other words, the main scanning direction. Note that these ranges may be two-dimensional areas as described in the modification. Further, the present invention may also be applied to cases wherein enlargement/reduction (scaling) is carried out in two dimensions of the sub-scanning direction and the main-scanning direction.

Still further, in the preferred embodiment, although an image processing apparatus and image processing method capable of processing both enlargement and reduction have been described, an apparatus and method capable of only enlargement or reduction may also be applied.

What is claimed is:

1. An image processing apparatus for scaling an image comprising:
    a memory to store data representing the image; and
    a processor, which:
        determines a pixel operation position which is either a position for inserting or deleting a first pixel in accordance with a scaling ratio;
        inserts the first pixel or deletes the first pixel from the pixel operation position;
        calculates an error between a value of the first pixel and a first density representing densities of a first set of pixels located in a vicinity of the first pixel; and
        allocates the error to a second pixel selected from the first set of pixels, in such a manner that a value of the second pixel falls within an allowable range estimated from values of a second set of pixels near the second pixel.

2. The image processing apparatus of claim 1, wherein the processor restricts the vicinity to an area adjacent to the first pixel in a direction of scaling.

3. The image processing apparatus of claim 1, wherein the processor allocates the error to pixels within a predetermined area with respect to the first pixel.

4. The image processing apparatus of claim 1, wherein the processor:
    allocates a first portion of the error to the second pixel;
    selects a third pixel from the first set of pixels; and
    allocates a second portion of the error to the third pixel.

5. The image processing apparatus of claim 4, wherein
    the second pixel is located at a first distance from the first pixel,
    the third pixel is located at a second distance from the first pixel, and
    the second distance is greater than the first distance.

6. The image processing apparatus of claim 5, wherein the first portion of the error is greater than the second portion of the error.

7. The image processing apparatus of claim 1, wherein the processor estimates the allowable range using an interpolation algorithm.

8. The image processing apparatus of claim 1, wherein the processor determines a maximum value and a minimum value of the allowable range, based on values of pixels adjacent to the second pixel.

9. A computer-implemented image processing method for scaling an image comprising steps of:
- determining a pixel operation position;
- inserting or deleting a first pixel at the pixel operation position;
- calculating an error between a value of the first pixel and a first density representing densities of a first set of pixels located in a vicinity of the first pixel; and
- allocating error to a second pixel selected from the first set of pixels in such a manner that a value, of the second pixel falls within an allowable range estimated from values of a second set of pixels near the second pixel.

10. The computer-implemented image processing method of claim 9, further including restricting the vicinity to an area adjacent to the first pixel in a direction of scaling.

11. The computer-implemented image processing method of claim 10, wherein the area is a one-dimensional area.

12. The computer-implemented image processing method of claim 9, wherein the vicinity comprises a two-dimensional area adjacent to the first pixel.

13. The computer-implemented image processing method of claim 9, further including allocating the error to pixels within a predetermined area with respect to the first pixel.

14. The computer-implemented image processing method of claim 9, further including:
- allocating a first portion of the error to the second pixel;
- selecting a third pixel from the first set of pixels; and
- allocating a second portion of the error to the third pixel.

15. The computer-implemented image processing method of claim 14, wherein
- the second pixel is located at a first distance from the first pixel,
- the third pixel is located at a second distance from the first pixel, and
- the second distance is greater than the first distance.

16. The computer-implemented image processing method of claim 15, wherein the first portion of the error is greater than the second portion of the error.

17. The computer-implemented image processing method of claim 9, further including estimating the allowable range using an interpolation algorithm.

18. The computer-implemented image processing method of claim 17, wherein the interpolation algorithm is a spline interpolation algorithm.

19. The computer-implemented image processing method of claim 9, further including determining a maximum value and a minimum value of the allowable range based on values of pixels adjacent the second pixel.

* * * * *